(12) United States Patent
Chen et al.

(10) Patent No.: US 10,627,518 B2
(45) Date of Patent: Apr. 21, 2020

(54) TRACKING DEVICE WITH IMPROVED WORK SURFACE ADAPTABILITY

(71) Applicant: PixArt Imaging Inc., Hsin-Chu County (TW)

(72) Inventors: Hui-Hsuan Chen, Hsin-Chu County (TW); Cheng-Lin Yang, Hsin-Chu County (TW); Tzu-Yu Chen, Hsin-Chu County (TW)

(73) Assignee: PIXART IMAGING INC, Hsin-Chu County (TW)

( * ) Notice: Subject to any disclaimer, the term of this patent is extended or adjusted under 35 U.S.C. 154(b) by 63 days.

(21) Appl. No.: 15/841,376

(22) Filed: Dec. 14, 2017

(65) Prior Publication Data

US 2018/0348373 A1 Dec. 6, 2018

Related U.S. Application Data

(60) Provisional application No. 62/514,349, filed on Jun. 2, 2017.

(51) Int. Cl.
| | | |
|---|---|---|
| G01S 17/66 | (2006.01) |
| H04N 5/225 | (2006.01) |
| G01S 17/50 | (2006.01) |
| G06T 7/521 | (2017.01) |
| G01S 7/481 | (2006.01) |
| G01S 17/46 | (2006.01) |
| G01S 7/48 | (2006.01) |
| H04N 5/33 | (2006.01) |
| G01S 17/48 | (2006.01) |
| G01S 17/08 | (2006.01) |

(52) U.S. Cl.
CPC ............ *G01S 17/66* (2013.01); *G01S 7/4808* (2013.01); *G01S 7/4815* (2013.01); *G01S 7/4816* (2013.01); *G01S 17/46* (2013.01); *G01S 17/50* (2013.01); *G06T 7/521* (2017.01); *H04N 5/2252* (2013.01); *H04N 5/2256* (2013.01); *G01S 17/08* (2013.01); *G01S 17/48* (2013.01); *G06T 2207/10004* (2013.01); *G06T 2207/10152* (2013.01); *H04N 5/33* (2013.01)

(58) Field of Classification Search
CPC ........ G06F 3/011; G06F 3/0346; G06F 3/017; G06F 3/012; G02B 27/017; G02B 2027/0187; G02B 2027/0138; H04S 7/304; H04S 2400/15; H04S 7/303; H04S 1/007; H04S 2400/11; H04R 5/033; H04R 2499/15
See application file for complete search history.

(56) References Cited

U.S. PATENT DOCUMENTS 6,256,016 B1 * 7/2001 Piot ....................... G06F 3/0317
    250/208.2
6,618,038 B1 * 9/2003 Bohn .................. G06F 3/03544
    250/208.1

(Continued)

*Primary Examiner* — Nitin Patel
*Assistant Examiner* — Amy Onyekaba
(74) *Attorney, Agent, or Firm* — Hauptman Ham, LLP

(57) ABSTRACT

A tracking device including an image sensor, a light source and a processor is provided. The image sensor senses reflected light or scattered light formed by the light source illuminating a work surface. The processor calculates a trace of the tracking device according to one of the reflected light and the scattered light that generates more apparent image features so as to increase the adaptable work surfaces.

18 Claims, 3 Drawing Sheets

(56) References Cited

U.S. PATENT DOCUMENTS

| | | | |
|---|---|---|---|
| 2012/0200861 A1* | 8/2012 | Chen | G01B 11/002 356/614 |
| 2013/0113705 A1* | 5/2013 | Gu | A61B 5/1455 345/166 |
| 2014/0111437 A1* | 4/2014 | Chen | G06F 3/03543 345/166 |
| 2014/0191959 A1* | 7/2014 | Kao | G06F 3/0304 345/157 |
| 2014/0333540 A1* | 11/2014 | Wang | G06F 3/03543 345/166 |
| 2015/0177857 A1* | 6/2015 | Chin | G06F 3/0317 345/163 |

* cited by examiner

TRACKING DEVICE WITH IMPROVED WORK SURFACE ADAPTABILITY

CROSS REFERENCE TO RELATED APPLICATION

This application claims the priority benefit of U.S. Provisional Application Ser. No. 62/514,349, filed on Jun. 2, 2017, the full disclosure of which is incorporated herein by reference.

BACKGROUND

1. Field of the Disclosure

This disclosure generally relates to an optical tracking device, more particularly, to an optical tracking device with improved work surface adaptability.

2. Description of the Related Art

The optical displacement detection device generally includes a light source, an image sensor and a processor. The light source is used to illuminate a work surface. The image sensor is used to acquire reflected light from the work surface and output pixel data. The processor calculates displacement of the displacement detection device with respect to the work surface according to the pixel data.

However, the conventional optical displacement detection devices have the limitation that they cannot be operated normally at all work surfaces. For example, a displacement detection device adaptable to reflective surfaces may not be operable on the absorptive surfaces, and vice versa.

Accordingly, an optical displacement detection device capable of being operated in any work surface is necessary.

SUMMARY

The present disclosure provides a tracking device adaptable to both the smooth and rough work surfaces.

The present disclosure further provides a tracking device capable of calculating a distance between the image sensor and the work surface, and the tracking device calculates a ratio for adjusting displacement according to the distance to output identical counts per inch (CPI) to improve the user experience.

The present disclosure provides a tracking device configured to detect displacement with respect to a work surface. The tracking device includes an image sensor, a lens, a first light source and a second light source. The image sensor is configured to output image frames. The first light source is configured to emit light toward the work surface to generate reflected light that impinges on the image sensor without passing through the lens. The second light source is configured to emit light toward the work surface to generate scattered light that impinges on the image sensor after passing through the lens.

The present disclosure further provides a tracking device configured to detect displacement with respect to a work surface. The tracking device includes an image sensor, a partially reflective plate, a first light source and a second light source. The image sensor is configured to output image frames. The first light source is configured to emit light toward the work surface to generate scattered light that impinges on the image sensor without passing through the partially reflective plate. The second light source is configured to emit light toward the partially reflective plate to generate partial reflected light perpendicular to the work surface, and the partial reflected light impinges on the image sensor after being reflected by the work surface.

The present disclosure further provides a tracking device configured to detect displacement with respect to a work surface. The tracking device includes a first image sensor, a second image sensor, a lens and a first light source. The first image sensor is configured to output first image frames. The second image sensor is configured to output second image frames. The first light source is configured to emit light toward the work surface to generate reflected light and scattered light, wherein the reflected light impinges on the first image sensor without passing through the lens, and the scattered light impinges on the second image sensor after passing through the lens.

In the present disclosure, the work surface is a table surface, a ground, a carpet surface, a glass surface, a tile surface or other surfaces for the tracking device to move thereon. The tracking device is adaptable to different work surfaces using different operating modes.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The present disclosure is applied to an optical tracking device that is adaptable to any work surface including strong reflective surfaces such as a glass surface or a light color tile surface, and weak reflective surfaces such as a carpet surface or a dark color tile surface to effectively increase the operable work surfaces of the tracking device.

Figure 1:
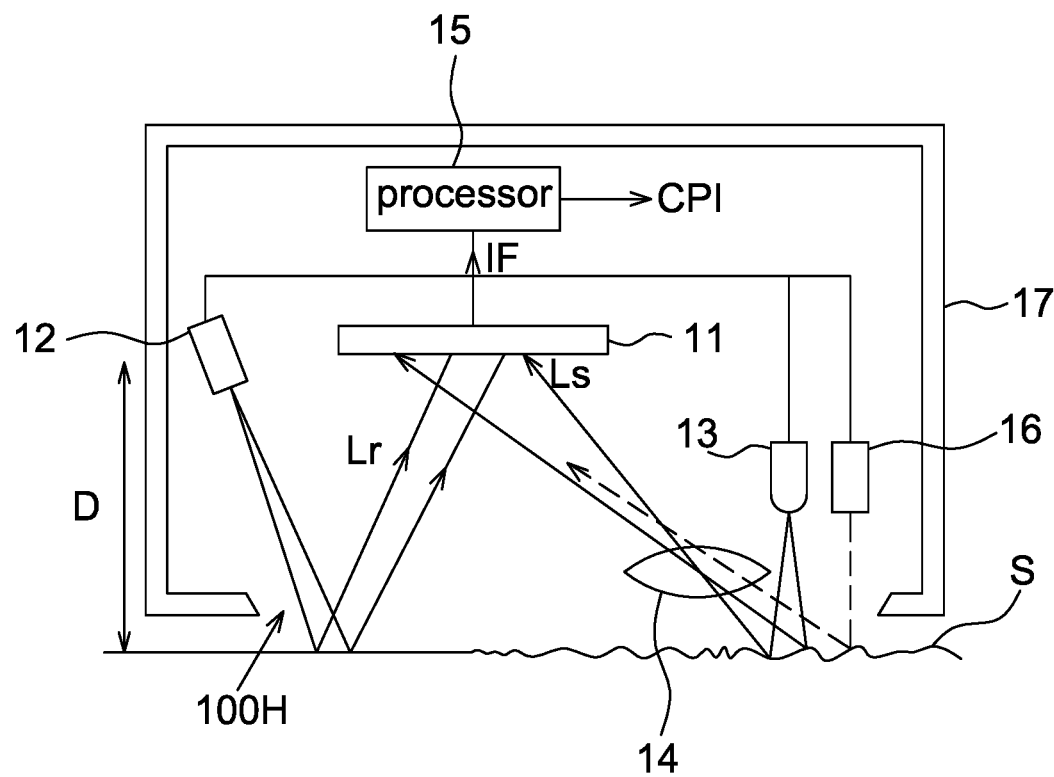
FIG. 1 is a schematic diagram of a tracking device according to one embodiment of the present disclosure.

Referring to FIG. 1, it is a schematic diagram of a tracking device 100 according to one embodiment of the present disclosure. The tracking device 100 is, for example, an optical mouse, a cleaning robot or other optical devices capable of moving on a work surface S and detecting displacement or trace with respect to the work surface S. The work surface S is, for example, a table surface, a ground, a carpet surface, a glass surface, a tile surface or other surfaces for the tracking device 100 to move thereon depending on different applications.

The tracking device 100 includes a housing 17 whose material is not particularly limited. A bottom surface of the housing 17 has an opening 100H for the light source and the image sensor therein to detect surface features of the work surface S and calculate displacement accordingly.

Inside the housing 17 of the tracking device 100 is disposed with an image sensor 11, a first light source 12, a second light source 13, a lens 14 and a processor 15. In some embodiments, the image sensor 11, the first light source 12, the lens 14 and the processor 15 are formed within the same package. In other embodiments, the second light source 13 is also integrated in said same package. The processor 15 is electrically coupled with the image sensor 11, the first light source 12 and the second light source 13.

The image sensor 11 includes, for example, a CCD image sensor, a CMOS image sensor or other optical sensors that generate image frames IF at a predetermined or changeable sample rate according to incident light received by a pixel array thereof. The image sensor 11 preferably detects invisible light (e.g., infrared light), or detects full spectrum light but has an optical filter for blocking visible light.

The first light source 12 is used to emit light toward the work surface S, via the opening 100H, to generate reflected light Lr that impinges on the image sensor 11 without passing through the lens 14 or any other lens after penetrating the opening 100H. In other words, the image sensor 11 is arranged on a main reflected light path (i.e. receiving a main reflected light beam with a reflected angle equal to an incident angle of a main incident light beam) to facilitate the detection of the reflected light Lr generated by the first light source 12 at a strong reflective surface (e.g., a light color tile surface, a glass surface or the like). The first light source 12 is, for example, a laser diode for emitting invisible light.

The second light source 13 is used to emit light toward the work surface S, via the opening 100H, to generate scattered light Ls that impinges on the image sensor 11 passing through the lens 14 after penetrating the opening 100H. The lens 14 is preferably a convex lens for condensing the scattered light Ls onto a sensing array of the image sensor 11. In other words, the image sensor 11 is not arranged on a main reflected light path of the second light source 13 (not receiving a main reflected light beam corresponding to a main incident light beam of the second light source 13) for detecting the scattered light Ls generated by the second light source 13 at a weak reflective surface (e.g., a dark color tile surface, a carpet surface or the like). The second light source 13 is, for example, a light emitting diode or a laser diode for emitting invisible light. The laser diode has an emission angle from 18 to 30 degrees, and the light emitting diode has an emission angle about 30 degrees, but not limited thereto.

It should be mentioned that although the light passing through the lens 14 is referred to the scattered light Ls in this embodiment, said scattered light Ls is actually formed by the work surface S reflecting the light emitted from the second light source 13 only the propagation of the scattered light Ls is not on the main reflected light path (i.e. the path of a main reflected light beam with a reflected angle equal to an incident angle of a main incident light beam) of the second light source 13 to distinguish from the reflected light Lr. The reflected light Lr is referred to the light reflected from the work surface S and propagating on the main reflected light path.

The processor 15 is, for example, a digital signal processor (DSP), a microcontroller (MCU), an application specific integrated circuit (ASIC), a central processing unit (CPU) or other processing devices for processing image frames IF. The function of the processor 15 is implemented by software, hardware, firmware or a combination thereof.

The processor 15 is used to control the first light source 12 or the second light source 13 to emit light. For example, when the tracking device 100 is moving on a strong reflective surface, preferably the first light source 12 is controlled to turn on while the second light source 13 is controlled to turn off so as to calculate displacement according to the image frames IF captured by the image sensor 11 when the first light source 12 is emitting light. When the tracking device 100 is moving on a weak reflective surface, preferably the first light source 12 is controlled to turn off while the second light source 13 is controlled to turn on so as to calculate displacement according to the image frames IF captured by the image sensor 11 when the second light source 13 is emitting light. It is possible to use the conventional method to calculate the displacement, e.g., comparing two image frames, calculating correlation between image frames or the like without particular limitations.

For example, the processor 15 calculates image features of the image frames IF, and controls the first light source 12 or the second light source 13 to turn on according to the calculated image features. In this embodiment, said image feature is referred to, for example, a parameter capable of indicating the image quality such as a count number of the gray level difference between adjacent pixels larger than a predetermined value, the image contrast, the image sharpness, a number of peaks or edges in an image frame IF, but not limited thereto. The processor 15 turns on the first light source 12 or the second light source 13 according to the image frame IF having a better image feature.

For example, after the tracking device 100 is startup or ends a sleep mode, the processor 15 is previously set to directly turn on the first light source 12 (or the second light source 13) to operate. When the processor 15 calculates that the image feature of the image frames IF is lower than a predetermined value or the image feature variation of the image frames IF exceeds a predetermined variation threshold, a switching mode is entered. In the switching mode, the processor 15 sequentially controls the first light source 12 to turn on to acquire a first image frame, and controls the second light source 13 to turn on to acquire a second image frame. Next, the processor 15 compares the first image frame and the second image frame to confirm the one having a better image feature. When the first image frame has a better image feature, the processor 15 controls the first light source 12 to emit light corresponding to the image capturing of the image sensor 11 and returns to a normal mode to operate continuously. When the second image frame has a better image feature, the processor 15 controls the second light source 13 to emit light corresponding to the image capturing of the image sensor 11 and returns to a normal mode to operate continuously. Then, when the processor 15 detects, in the normal mode, that the image feature of the image frames IF is lower than the predetermined value or the image feature variation of the image frames IF exceeds the predetermined variation threshold again, the switching mode is entered again. The tracking device 100 enters the switching mode from the normal mode when a surface condition is changed so as to select a better operating state. In this way, the tracking device 100 is adaptable to different work surfaces.

In this embodiment, said normal mode is referred to a mode in which one of two light sources is turned on and the displacement is calculated. Said switching mode herein is referred to a mode in which the light source to be used is determined and the displacement is not calculated.

In some embodiments, the tracking device 100 further includes a third light source 16 which is preferably a dot light source formed by a laser diode for performing the height identification. The dot light source herein is referred to forming a light spot at the work surface S. Preferably, the first light source 11 and the second light source 12 are turned off when the third light source 16 is turned on. The processor 15 calculates a distance D from the work surface S according to the image frames IF captured by the image sensor 11 corresponding to the lighting of the third light source 16. For example, the processor 15 calculates the distance D from the work surface S using the triangulation according to the imaging position of the third light source 16 in the image frame IF, using the time-of-flight (TOF) method or using other conventional distance measuring method without particular limitations.

The processor 15 further adjusts a ratio of the calculated displacement according to the distance D so as to output identical counts per inch (CPI), assumed as $\Delta s \times R$, when the tracking device 100 is moving at a constant speed. For example, the tracking device 100 further includes a memory, e.g., non-volatile memory, for storing a plurality of ratios R corresponding to different distances D. When the processor 15 obtains a longer distance D, a higher ratio R is multiplied to the displacement $\Delta s$, whereas when the processor 15 obtains a shorter distance D, a lower ratio R is multiplied to the displacement $\Delta s$ such that the processor 15 outputs the identical CPI when the tracking device 100 is moving at a constant speed. In this way, even though the processor 15 calculates the displacement using different light sources, the user still feels a constant speed to have a better user experience.

It should be mentioned that the third light source 16 and the height calculation function of the processor 15 are optional according to different applications.

Figure 2:
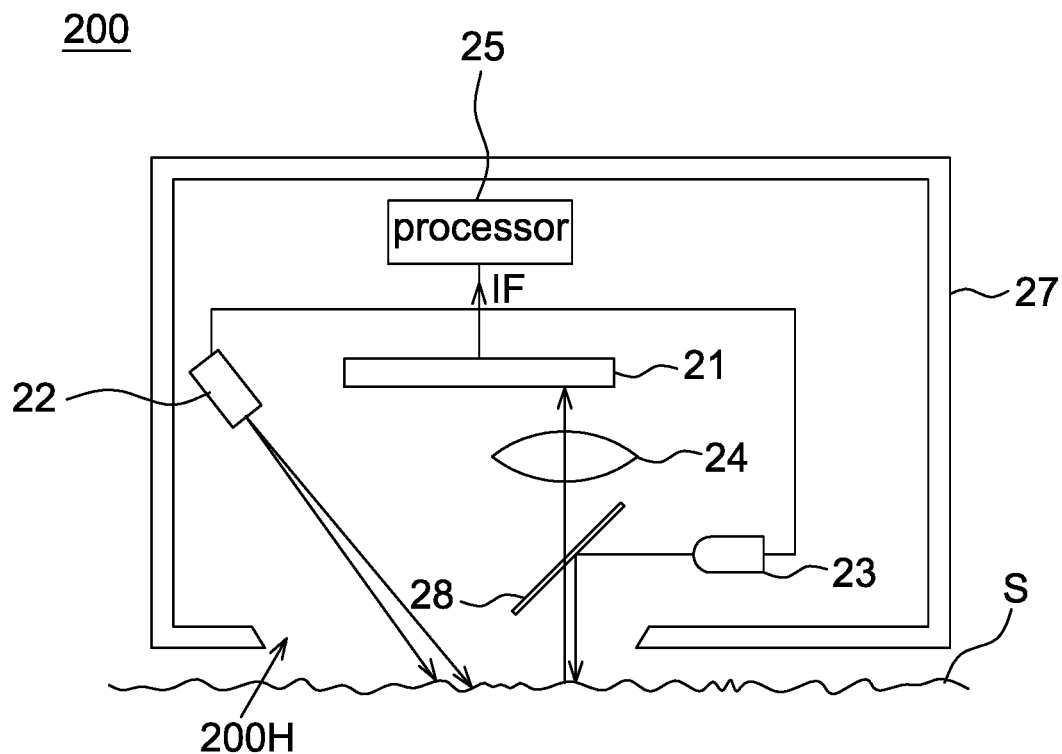
FIG. 2 is a schematic diagram of a tracking device according to another embodiment of the present disclosure.

Referring to FIG. 2, it is a schematic diagram of a tracking device 200 according to another embodiment of the present disclosure. The function and effect of the tracking device 200 is identical to those of FIG. 1, i.e. for detecting displacement with respect to the work surface S. The difference is the operation of components inside a housing 27, which is similar to the housing 17 in FIG. 1.

The tracking device 200 includes an image sensor 21, a partially reflective plate 28, a first light source 22, a second light source 23, a lens 24 and a processor 25. The processor 25 is electrically coupled to the image sensor 21, the first light source 22 and the second light source 23.

The image sensor 21 includes, for example, a CCD image sensor, a CMOS image sensor or other optical sensors that generate image frames IF at a predetermined or changeable sample rate according to incident light received by a pixel array thereof. Similarly, the image sensor 21 preferably senses invisible light, e.g., infrared light.

The first light source 22 is used to emit light toward the work surface S, via the opening 200H, to generate scattered light that impinges on the image sensor 21 without passing through the partially reflective plate 28 and the lens 24 or any lens after penetrating the opening 200H. The first light source 22 is selected as a light emitting diode or a laser diode, and has an emission angle. The image sensor 21 is not arranged on a main reflected light path of the first light source 22 (i.e. not receiving a main reflected light beam) for detecting the scattered light generated by the first light source 22 at a weak reflective surface. In this embodiment, definitions of the main reflected light path and the scattered light are described above, and thus details thereof are not repeated herein.

The second light source 23 is used to emit light toward the partially reflective plate 28 to generate partial reflected light perpendicular to the work surface S to illuminate the work surface S via the opening 200H. The partial reflected light is reflected by the work surface S and then impinges on the image sensor 21. In this embodiment, the partially reflective plate 28 is, for example, a plastic plate or a glass plate for reflecting a part of light emitted by the second light source 23. The reflectivity and transmittance of the partially reflective plate 28 do not have particular limitations as long as a part of light emitted by the second light source 23 is reflected to project toward the work surface S perpendicularly. After being reflected by the work surface S, the partial reflected light projects upward to the partially reflective plate 28, and a part of the partial reflected light penetrates the partially reflective plate 28 to reach a pixel array of the image sensor 21 after passing through the lens 24 (e.g., convex lens) arranged between the partially reflective plate 28 and the image sensor 21. As the second light source 23 is used to generate the reflected light perpendicular to both the work surface S and the image sensor 21, the second light source 23 is suitable for a strong reflective surface.

By arranging the partially reflective plate 28, as the intensity of the light emitted by the second light source 23 is extensively degraded after passing through the partially reflective plate 28 twice, enough reflected light is generated only on a strong reflective surface. Meanwhile, as the image sensor 21 is not on a main reflected light path of the first light source 22, the scattered light impinging on the image sensor 22 is weak on a strong reflective surface. The processor 25 (similar to the processor 15 in FIG. 1) calculates displacement according to the reflected light of the second light source 23 in the image frames IF on the strong reflective surface.

On a weak reflective surface, the second light source 23 does not generate enough reflected light, and thus the processor 25 calculates displacement according to the scattered light of the first light source 22 in the image frames IF. With the above characteristics, the first light source 22 and the second light source 23 are turned on simultaneously, but not limited to. It is possible that the processor 25 compares the image features of the image frames captured when different light sources are lighting so as to turn on only one of the two light sources in a normal mode. The comparing method is similar to that of the previous embodiment, and thus details thereof are not repeated herein.

In addition, in this embodiment in order to avoid generating a fixed light spot on the partially reflective plate 28 thereby generating fixed imaging noise in the image frames IF, the second image sensor 23 is selected as a light emitting diode instead of a laser diode. In other embodiments, if the processor 25 is able to eliminate the fixed imaging noise in the image frames IF, the second light source 23 is selected as a laser diode.

Figure 3:
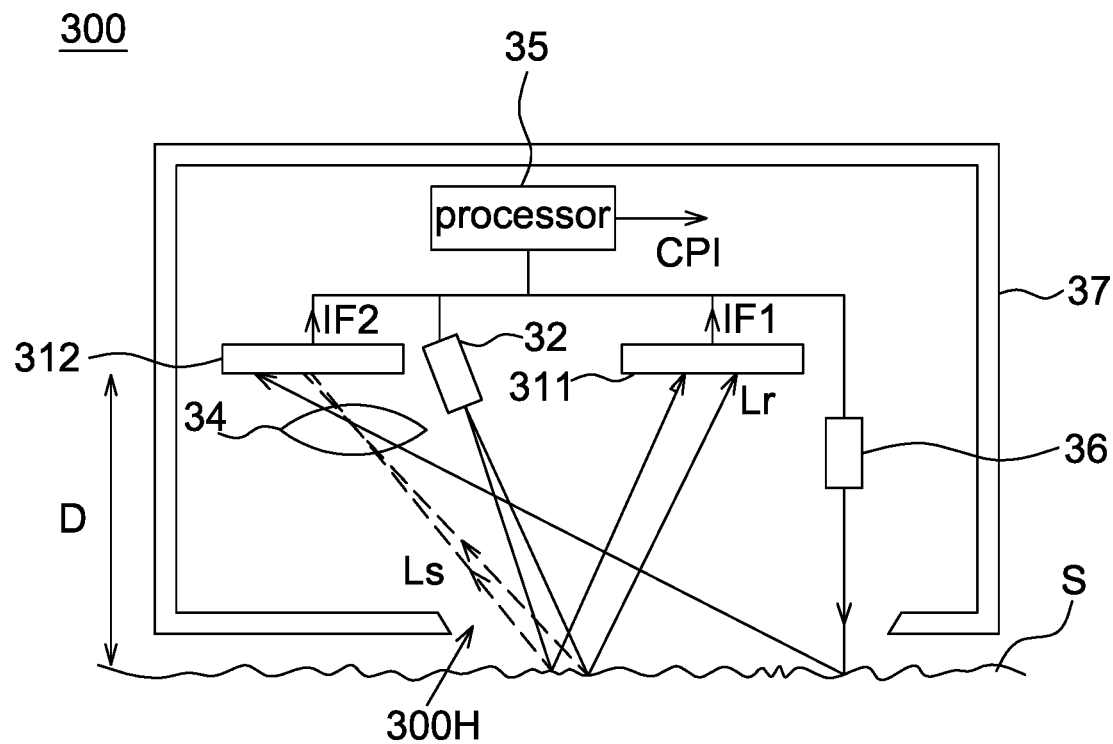
FIG. 3 is a schematic diagram of a tracking device according to an alternative embodiment of the present disclosure.

Referring to FIG. 3, it is a schematic diagram of a tracking device 300 according to an alternative embodiment of the present disclosure. The function and effect of the tracking device 300 are similar to those of FIG. 1, i.e. for detecting displacement with respect to the work surface S. The difference is that in order to reduce the size of an opening 300H at the bottom surface of a housing 37, the arrangement of a single light source and two image sensors is used in this embodiment.

The tracking device 300 includes a first image sensor 311, a second image sensor 312, a first light source 32, a lens 34 and a processor 35. The processor 35 is electrically coupled to the first image sensor 311, the second image sensor 312 and the first light source 32.

The first image sensor 311 and the second image sensor 312 include, for example, CCD image sensors, CMOS image sensors or other optical sensors that respectively generate first image frames IF1 and second image frames IF2 at a predetermined or changeable sample rate according to incident light received by a pixel array thereof. Similarly, the first image sensor 311 and the second image sensor 312 are preferably adapted to sense invisible light. Preferably, the first image sensor 311 and the second image sensor 312 are two different image sensors and have a respective pixel array, wherein said two pixel arrays have identical or different sizes and resolutions.

The first light source 32 is used to emit light toward the work surface S, via the opening 300H, to generate reflected light Lr and scattered light Ls. The reflected light Lr impinges on the first image sensor 311 without passing through the lens 34 or any lens after penetrating the opening 300H. The scattered light Ls impinges on the second image sensor 312 passing through the lens after penetrating the opening 300H.

As the first image sensor 311 is used to detect reflected light Lr, the first image sensor 311 is arranged on a main reflected light path of the first light source 32 (receiving a main reflected light beam corresponding to a main incident light beam of the first light source 32). When the tracking device 30 is moving on a strong reflective surface, the first image sensor 311 senses a better image feature.

As the second image sensor 312 is used to detect scattered light Ls, the second image sensor 312 is not arranged on the main reflected light path of the first light source 32 (not receiving the main reflected light beam). When the tracking device 30 is moving on a weak reflective surface, the first image sensor 311 senses a worse image feature while the second image sensor 312 senses a better image feature. Accordingly, the processor 35 (similar to the processor 15 in FIG. 1) controls the first image sensor 311 or the second image sensor 312 to turn off according to the work surface S on which the tracking device 300 is operating.

In this embodiment, definitions of the reflected light, the scattered light and the main reflected light path have been described above, and thus details thereof are not repeated herein.

For example, the processor 35 is used to calculate image features of the first image frames IF1 and the second image frames IF2, and controls the first image sensor 311 or the second image sensor 312 to turn off according to the calculated image features, wherein the image feature has been described above and thus details thereof are not repeated herein.

For example, after the tracking device 300 is startup or ends a sleep mode, the processor 15 is previously set to directly turn on the first image sensor 311 (or the second image sensor 312) to operate. When the processor 15 calculates that the image feature of the first image frames IF1 (or the second image frames IF2) is lower than a predetermined value or the image feature variation of the first image frames IF1 (or the second image frames IF2) exceeds a predetermined variation threshold, a switching mode is entered. In the switching mode, the processor 35 sequentially or simultaneously controls the first image sensor 311 to acquire a first image frame IF1, and controls the image sensor 312 to acquire a second image frame IF2. Next, the processor 35 compares the first image frame IF1 and the second image frame IF2 to confirm the one having a better image feature. When the first image frame IF1 has a better image feature, the processor 35 controls the first image sensor 311 to operate continuously and returns to a normal mode. When the second image frame IF2 has a better image feature, the processor 35 controls the second image sensor 312 to operate continuously and returns to a normal mode. Then, when the processor 35 detects, in the normal mode, that the image feature of the first image frame IF1 or the second image framer IF2 (depending on the image sensor in operation) is lower than a predetermined value or the image feature variation thereof exceeds a predetermined variation threshold again, the switching mode is entered again. As mentioned above, the tracking device 100 of the present disclosure is adaptable to different work surfaces accordingly.

In this embodiment, said normal mode is referred to a mode in which one of two image sensors is turned on and the displacement is calculated. Said switching mode herein is referred to a mode in which the displacement is not calculated.

In some embodiments, the first image sensor 311 and the second image sensor 312 operate together, and the processor 35 selects the first image frames IF1 or the second image frames IF2 that have a better image feature to perform the tracking.

In some embodiments, the tracking device 300 further includes a dot light source 36 which is preferably formed by a laser diode for performing the height identification. The definition of the dot light source has been described above. Preferably, the first light source 11 is turned off, the second image sensor 312 is turned on and the first image sensor 311 is turned off when the dot light source 36 is turned on. The second image sensor 312 receives light emitted by the dot light source 36 and reflected by the work surface S via the lens 34. The processor 35 calculates a distance D from the work surface S according to the second image frames IF2 captured by the second image sensor 312 corresponding to the lighting of the dot light source 36. The method of calculating the distance D has been described above, and thus details thereof are not repeated herein.

The processor 15 further adjusts a ratio of the calculated displacement according to the distance D so as to output identical counts per inch (CPI) when the tracking device 300 is moving at a constant speed. For example, the tracking device 300 further includes a memory, e.g., non-volatile memory, for storing a plurality of ratios corresponding to different distances D. When the processor 35 obtains a longer distance D, a higher ratio is multiplied to the displacement, whereas when the processor 35 obtains a shorter distance D, a lower ratio is multiplied to the displacement such that the processor 35 outputs the identical CPI when the tracking device 300 is moving at a constant speed. In this way, even though the processor 35 calculates the displacement using different image frames (e.g., the first image frames IF1 or the second image frames IF2), the user still feels a constant speed to have a better user experience.

It should be mentioned that the values (e.g., emission angle) mentioned in the above embodiments are only intended to illustrate but not to limit the present disclosure. In the present disclosure, the processor controls the light source to emit light corresponding to the image capturing of the image sensor. The spatial relationship and ratio between every component in FIGS. 1-3 are only intended to illustrate but not to limit the present disclosure. In some embodiments, the above mentioned housing is disposed with a button(s) or a touch pad for being operated by the user, and has the lamp for indicating an operating state of the tracking device. In some embodiments, the housing is arranged with wheels for moving on the work surface.

In the present disclosure, the light source or the image sensor not being turned on is referred to that said light source or said image sensor is always turned off before a next switching mode is entered. By calculating the displacement at successive time intervals, it is possible to track the locus of the tracking device.

As mentioned above, the conventional optical tracking device is not able to correctly calculate the displacement on specific work surfaces to have lower adaptability. Therefore, the present disclosure provides an optical tracking device (as shown in FIGS. 1-3) that determines the suitable image frame for calculating displacement by calculating image features of two image frames captured under different conditions. The tracking device of the present disclosure switches between different operating states corresponding to different work surfaces to adapt to every kind of work surfaces.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A tracking device, configured to detect displacement with respect to a work surface, the tracking device comprising:
    an image sensor configured to output image frames;
    a lens;
    a first light source configured to emit light toward the work surface to generate reflected light that impinges on the image sensor without passing through the lens;
    a second light source configured to emit light toward the work surface to generate scattered light that impinges on the image sensor passing through the lens;
    a third light source; and
    a processor configured to calculate a distance from the work surface according to the image frames captured by the image sensor when the third light source is turned on.

2. The tracking device as claimed in claim 1, wherein the processor is further configured to control the first light source or the second light source to emit the light.

3. The tracking device as claimed in claim 2, wherein the processor is configured to calculate image features of the image frames, and control the first light source and the second light source according to the image features.

4. The tracking device as claimed in claim 1, wherein
    the first light source is a laser diode, and
    the second light source is a light emitting diode or a laser diode.

5. The tracking device as claimed in claim 1, wherein
    the third light source is a dot light source, and
    the first light source and second light source are turned off when the third light source is turned on.

6. The tracking device as claimed in claim 1, wherein the processor is further configured to adjust a ratio of the displacement according to the distance to output identical counts per inch.

7. A tracking device, configured to detect displacement with respect to a work surface, the tracking device comprising:
    a first light source configured to emit light toward the work surface;
    a second light source configured to emit light toward the work surface;
    an image sensor configured to receive light reflected or scattered from the work surface to output image frames, wherein the image sensor is arranged on a main reflected light path of the first light source to receive a main reflected light beam associated with the first light source, and not arranged on a main reflected light path of the second light source to not receive a main reflected light beam associated with the second light source;
    a third light source; and
    a processor configured to calculate a distance from the work surface according to the image frames captured by the image sensor when the third light source is turned on.

8. The tracking device as claimed in claim 7, wherein
    the first light source is a laser diode; and
    the second light source is a light emitting diode or a laser diode.

9. The tracking device as claimed in claim 8, wherein
    when the second light source is a light emitting diode, the light emitting diode has an emission angle of 30 degrees, and
    when the second light source is a laser diode, the laser diode has an emission angle from 18 to 30 degrees.

10. The tracking device as claimed in claim 7, wherein
    the third light source is a dot light source, and
    the first light source and second light source are turned off when the third light source is turned on.

11. The tracking device as claimed in claim 7, wherein the processor is further configured to adjust a ratio of the displacement according to the distance.

12. The tracking device as claimed in claim 11, wherein
    the ratio is lower when the distance is shorter, and
    the ratio is higher when the distance is longer.

13. The tracking device as claimed in claim 7, further comprising a lens arranged at a light path between the second light source and the image sensor.

14. A tracking device, configured to detect displacement with respect to a work surface, the tracking device comprising: a laser diode configured to emit light toward the work surface; a light emitting diode configured to emit light toward the work surface; an image sensor configured to output a first image frame when the laser diode is turned on and output a second image frame when the light emitting diode is turned on; a third light source; a processor configured to compare the first image frame and the second image frame to confirm which of the first image frame and the second image frame has a better image feature, and calculate a distance from the work surface according to an image frame captured by the image sensor when the third light source is turned on.

15. The tracking device as claimed in claim 14, wherein the third light source is a dot light source, and the laser diode and the light emitting diode are turned off when the third light source is turned on.

16. The tracking device as claimed in claim 14, wherein the processor is further configured to adjust a ratio of the displacement according to the distance.

17. The tracking device as claimed in claim 16, wherein
    the ratio is lower when the distance is shorter, and
    the ratio is higher when the distance is longer.

18. The tracking device as claimed in claim 14, further comprising a lens arranged at a light path between the light emitting diode and the image sensor.

* * * * *